United States Patent [19]

Auslander

[11] Patent Number: 5,084,205
[45] Date of Patent: Jan. 28, 1992

[54] INK SOLUTION COMPRISING RED FLOURESCENT MATERIALS WITH A NON RED VISUAL COLOR

[75] Inventor: Judith Auslander, Westport, Conn.
[73] Assignee: Pitney Bowes Inc., Stamford, Conn.
[21] Appl. No.: 615,110
[22] Filed: Nov. 19, 1990
[51] Int. Cl.$^5$ ............................................. C09K 11/06
[52] U.S. Cl. ........................ 252/301.16; 252/301.35; 106/22
[58] Field of Search .................. 252/301.16, 301.21, 252/301.34, 301.35; 430/82; 106/22

[56] References Cited

U.S. PATENT DOCUMENTS

| | | | |
|---|---|---|---|
| 3,928,226 | 12/1975 | McDonough | 252/301.35 |
| 4,211,813 | 7/1980 | Gravisse | 252/301.35 |
| 4,711,832 | 12/1987 | Gruenbaum | 430/965 |

Primary Examiner—Prince Willis, Jr.
Assistant Examiner—Thomas Steinberg
Attorney, Agent, or Firm—Peter Vrahotes; Melvin J. Scolnick; David E. Pitchenik

[57] ABSTRACT

Solution inks have been discovered that have an acceptable red fluorescent signal for machine detection while emitting a different visual color in white light. The formulation is based on a combination of a fluorescent dyes and a non red dye belonging to the spectral sensitizer class of dyes. The red fluorescent dye and non-red dye are combined in a resin to form a toner. Because of a bathochronic shift, fluorescence at higher wave lengths is achieved. Upon dissolving the toner in a polar solvent, increased viscosity is achieved which results in an enhanced fluorescent signal as compared to prior fluorescent inks.

4 Claims, 2 Drawing Sheets

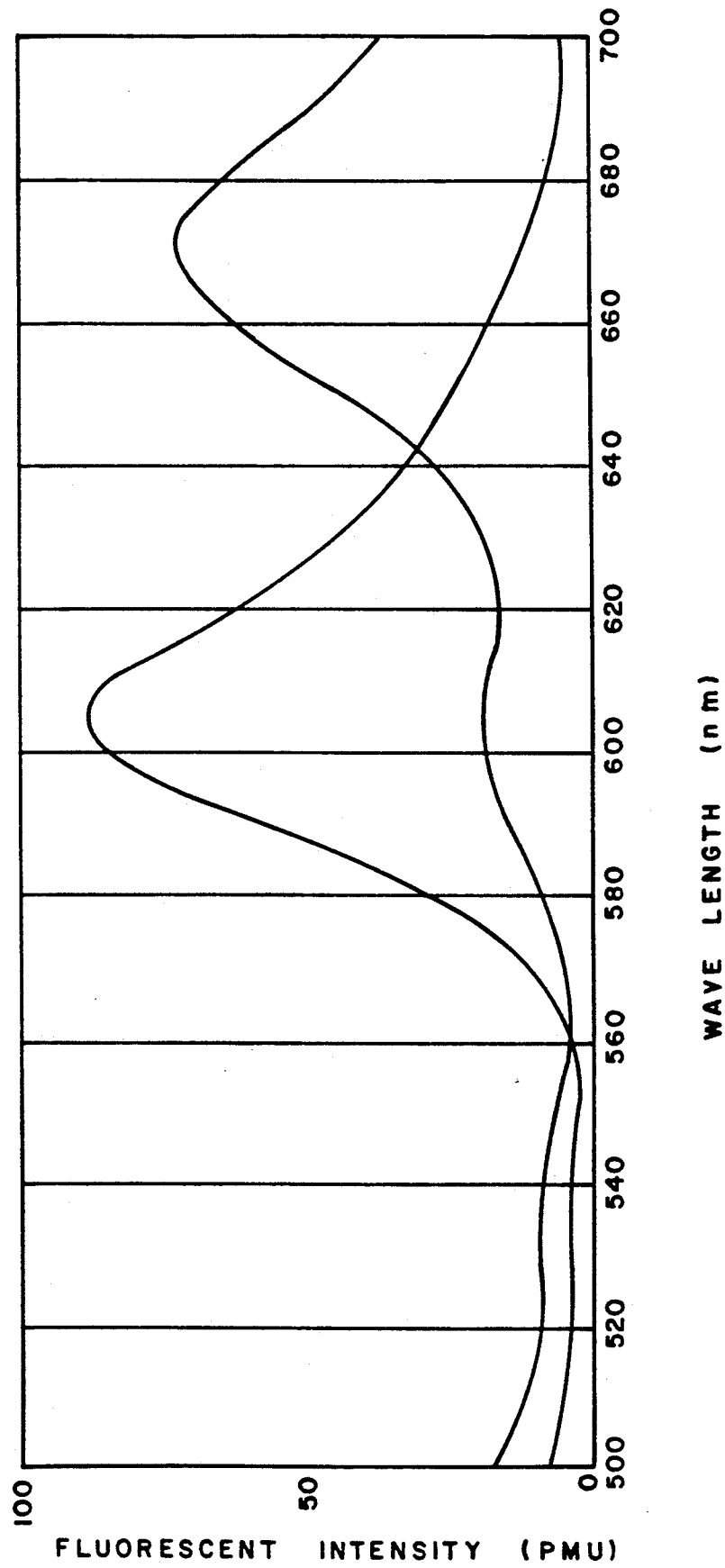

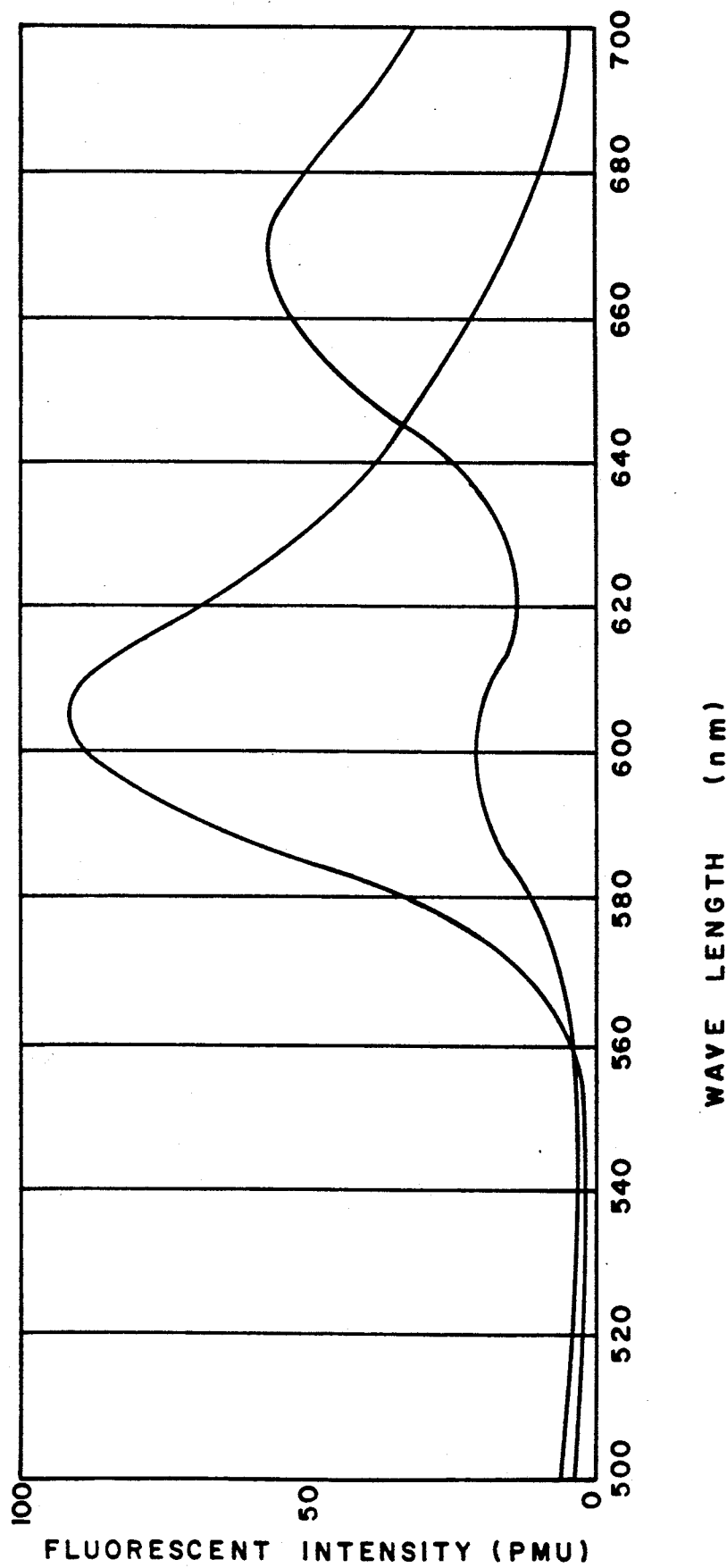

INK SOLUTION COMPRISING RED FLOURESCENT MATERIALS WITH A NON RED VISUAL COLOR

BACKGROUND OF THE INVENTION

In the machine processing of various types of tickets, tags, labels, postage imprints and the like, it is generally know to employ detectors which are responsive to colors, and in many cases to the fluorescence of an ink which may be excited by ultraviolet light. Fluorescent inks and dyes and methods of making the same have long been known as disclosed in U.S. Pat. Nos. 2,681,317; 2,763,785; 3,230,221; 3,421,104; 3,452,075; 3,560,238; and 4,015,131. It is known, for example, in the postage meter art to provide a red fluorescent ink for the machine reading of processed mail. Fluorescent inks are those in which the ink exhibits a first color, such as black or green, in the visible spectrum and a second color when subjected to ultraviolet light.

Although the inks and dyes used previously for the purposes described have worked relatively well, certain drawbacks exist. With regard to fluorescent inks, prior fluorescent inks were dispersion inks that experience frequent color separation upon aging. In addition, the prior red fluorescent inks with non-red visual color generally have dull visual colors. It is difficult to obtain a red fluorescent ink with a non-red visual color in solution because of interaction between the dyes that causes the non-red visual color to absorb the fluorescent imaging. This is known as quenching and is occasioned by many factors such as internal conversion, competing mechanisms, absorption of incident light by foreign molecules, solvent interaction, and the like. The quenching effect is obvious with the blue dyes that absorb light between 600–640nm which is the emission range of the red fluorescent dye.

In a dispersed system with solute particles $>5\ \mu$ the quenching effect is not a problem because there is weaker interaction between the dye/pigment components as a result of low collision probability.

Clearly, it would be advantageous to provide a combination of materials that yield a red fluorescent color when subjected to ultra violet light and a non-red visible color. It is also desirable to have a fluorescent ink in solution that will not separate or become dull with the passage of time. Throughout the balance of this specification, red fluorescent solution ink with a non-red visual color will be referred to as non-red solution ink. Of course, what is meant by visual color is a color visible in daylight or white light.

SUMMARY OF THE INVENTION

Non-red solution inks and materials to produce such inks have been discovered that yield an acceptable visible color. The formulation is based on the combination of at least one dye belonging to the spectral sensitizer class of dyes with a red fluorescent dye in a resin to produce a toner resulting in acceptable fluorescence. The toners can be dissolved in a polar organic solvent to produce a solution having higher viscosity than prior fluorescent inks. The increased viscosity of these inks as well as the high percentage of polar solvents results in an enhanced fluorescent signal. These solution inks are advantageous because they are in a homogeneous phase with small particle sizes that do not separate since there is no difference in specific gravity. Also, the quenching effect is overcome because of re-emission of the red fluorescence at a higher wavelength.

BRIEF DESCRIPTION OF THE DRAWING

FIGS. 1 and 2 show graphs comparing fluorescent emissions of a fluorescent dye with the fluorescent emissions of the combination of a fluorescent dye with a second dye in accordance with the principles of the instant invention.

DETAILED DESCRIPTION OF THE PREFERRED EMBODIMENTS

The instant invention is directed to toners made of a resin with non-red dyes in combination with dyes that give an acceptable red fluorescent signal for detection. The toners and dyes can be dissolved in solvents to produce items such as coatings, paints, inks and the like. This invention will be described as used in inks, but it will be appreciated that the invention has application for other uses. The invention relates to the combination of an amide aldehyde/aryl sulfonamide resin, a red fluorescent dye and a dye which belongs to the spectral sensitizer class and causes the red fluorescent dye to yield fluorescence at higher wave lengths, i.e., 590–680nm. Basically, what is involved is a bathochromic shift on a primary dye of the toner. The toner is dissolved in a polar organic solvent with other components such as surfactants, alcohol and the like to produce product such as ink.

Although the ability of fluorescing in a solution is to some degree a property of the dissolved molecule, the fluorescent yield of a solution in which the excited molecules reside in permanent contact with some other molecules depends greatly on the nature of interaction with these molecules which may quench the fluorescence. The efficiency of quenching is greater the more closely the absorption band of the second dye coincides with the fluorescence band of the first dye. This could be due to the re-absorption of the fluorescent light.

This invention provides a longer wave length red fluorescence emission caused by the interaction of spectral sensitizers such as the diphenyl and triphenyl methane type and polymethyne with the xanthene dyes that yield red fluorescent dyes.

Red fluorescent ink with a blue visible color, for example, is obtained by the combination of blue dyes belonging to the triphenyl methane group such as: Acid Blue #9, or Acid Green #5 with a polyester resin containing a red fluorescent dye. The green and black inks with red fluorescence can be obtained by the combination of green dyes belonging to the same classes: di and triphenyl methane or cyanines such as, Acid Green #3. Black colored ink can be obtained by a subtractive combination of the green and blue dyes of the sensitizer class with a polyester resin. For purposes of this teaching, by spectral sensitizer class of dyes is meant those dyes having a chemical structure that yields an absorption spectra that overlaps with the emission spectra of the primary dye and has a high extinction coefficient, $>1 \times 10^2$ liters/mole cm, and a narrow band width $<50$ nm. The inks have increased viscosity 800–2000cp at 25° C., resulting from a high percentage of polar solvents inter alia. This results in an enhanced fluorescent signal.

One inventive combination is based on a polyester resin toner having a primary a red dye dissolved in a glycol/polyoxyethylene alcohol that emits a red fluorescent peak at 600nm when excited between 250–400 nm. It has been found that the addition of 0.01 to 0.35% of a sensitizer dye to a 25 to 35% glycol solution containing this polyester toner, induces a second emission peak at 660 nm. All percentages in this specification are weight percentages.

Examples of spectral sensitizer class dyes which shift the peak of fluorescence of the Xanthene dyes such as Rhodamine B and Rhodamine 6G are: C. I. Acid Blue #9 and C. I. Acid Green #5.

The following classes of dyes can be used in combination with red fluorescent dyes to occasion a wave length shift of the fluorescent emission.
 a) Polymethyne dyes: 3, 3' Diethylthiadicarbocyanine and 3, 3' Diethyloxadecarbocyamine iodide.
 b) Aryl Carbonium Dyes (Diphenyl and Triphenyl Methane
 This general class of dyes is the preferred class.
 c) Xanthene Dyes: Sulphorhodamine 101 and C. I. Basic Blue 12, The shifting of fluorescence to longer wave lengths may be explained as follows:
 a) Partial quenching of fluorescence by electronic energy transfer and bathochromic reemission by the quencher.
 b) Partial fluorescence quenching not involving energy transfer.

Solutes that are strong electron acceptors can act as quenching agents. The photo excited molecule of a fluorescent substance is both a stronger electron acceptor and a stronger electron doner than the same molecule in ground state; therefore the excited molecule is more likely than the ground state to induce a charge transfer complex with other solutes.
 c) The dual fluorescence may be interpreted as a large charge separation phenomena linked to a twisted (or small overlap) arrangement of chromophores called TICT (twisted intramolecular charge transfer). In the excited molecules the charge separation is most favorable in a twisted conformation where the doner and acceptor are orbitally decoupled.

EXAMPLE I

| Components | Commercial Source | Weight % |
|---|---|---|
| Rhodamine 6G | | 0.2 |
| Rhodamine 3B | | 0.8 |
| Polyester resin | Dayglow Corporation | 26 |
| Tetraethylene Glycol (TEEG) | Aldrich Chemical Co. | 10 |
| Polyoxethylene Decyl Ether | Synthrapol KB ICI | 42 |
| Tripropylene Glycol (TPG) | Aldrich Chemical Co | 5 |
| Krumbahr KRS | Lawter | 4 |
| Propylene Carbonate | Aldrich Chemical Co | 4 |
| Nonylphenoxy poly (ethylene oxy) ethanol | I GAF Corp. | 7.6 |
| Acid Blue #9 | Pylam Color Corp. | 0.2 |
| Silicon Glycol | Additive 57 Down Corning Inc. | 0.2 |

| Properties | |
|---|---|
| Viscosity | 1920 cps at 25° C. |
| Surface tension | 23.5 dyne/cm at 25° C. |
| Max emission | 600, 669 nm |
| Phosphor Meter Units (PMU) of drawdown on HB paper | 25 |
| PMU of hand prints on HB paper | 9 |
| Maximum wavelength | 460 nm | of reflectance
Same solvents and additives as Example I

EXAMPLE II

| Components | Commercial Source | Weight % |
|---|---|---|
| Basic Red #1/Basic Violet #11 | | 1 |
| Benzene sulphonamide/ Amino formaldehyde resin | Dayglow Corporation | 29 |
| Acid Green #3 | Pylam Corporation | 0.2 |
| TEEG | Aldrich Chemical Co. | 10 |
| TPG | Aldrich Chemical Co. | 10 |
| Polyoxyethylene fatty ester | ICI | 12.8 |
| Propylene carbonate | Aldrich Chemical Co. | 4 |
| Nonylphenoxy poly (ethylene oxy) ethanol | GAF Corp | 3 |
| Tridecyl alcohol ethoxylete | BASF | 20 |
| Oleyl alcohol ethoxylate | Amerochol | 10 |

| Properties | |
|---|---|
| Viscosity | 1000 cps |
| Surface tension | 30 dynes/cm |
| Maximum emission peaks | 600, 660 nm |
| PMU of drawdown | 23 |
| PMU of handprint | 9 |
| Reflectance | 440 nm |

EXAMPLE III

| Components | Commercial Source | Weight % |
|---|---|---|
| Rhodamine 6G | | 1 |
| Benzene sulphonamide/Amino formaldehyde resin | | 27 |
| Propylene Carbonate | Aldrich Chemical Corp. | 5 |
| Polyoxyethylene fatty ester G-2109 | ICI | 30 |
| Tetraethylene glycol TEEG | Aldrich Chemical Corp. | 16 |
| Tripropylene glycol TPG | Aldrich Chemical Corp. | 10 |
| Decylalcohol ethoxylate DA-6 | BASF | 10.8 |
| Nile Blue | Eastman Kodak Corp. | |
| C.I. Basic Blue 12 | | 0.2 |

| Properties | |
|---|---|
| Viscosity | 2000 cps |
| Emission peaks | 600, 660 nm |
| PMU of drawdown | 30 |
| Reflectance | 460 nm |

EXAMPLE IV

| Components | Commercial Source | Weight % |
|---|---|---|
| Rhodamine 6G | | 1 |
| Benzene sulphonamide/Amino formaldehyde resin | | 27 |
| Propylene Carbonate | Aldrich Chemical Corp. | 5 |
| Polyoxyethylene fatty ester G-2109 | ICI | 30 |
| Tetraethylene glycol TEEG | Aldrich Chemical Corp. | 16 |
| Tripropylene glycol TPG | Aldrich Chemical Corp. | 10 |
| Decylalcohol ethoxylate DA-6 | BASF | 10.8 |
| Nile Blue | Eastman Kodak Corp. | |

-continued

| | |
|---|---|
| C.I. Acid Blue #9 | 0.2 |
| Properties | |
| Viscosity | 2000 cps |
| Emission peaks | 600, 660 nm |
| PMU of drawdown | 30 |
| Reflectance | 460 nm |

With reference to FIG. 1, plot A shows fluorescent emission results of an ink solution as constituted in Example III without the presence of a dye of the spectral sensitizer class. It will be noted that the curve peaks at approximately 607 nm. Plot B is the same solution given in Example III but with 0.2% Nile Blue dye Basic Blue #12. It is seen that the fluorescent peaks shifted to approximately 669 nm. This demonstrates that quenching has occurred but a re-emission of the fluorescent signal took place.

The same results are shown in FIG. 2 using the components of Example I, plot A showing the emission without a visual dye and plot B showing the emission after the addition of 0.2% Acid Blue #9 to the ink solution.

Thus, what has been shown and described are red fluorescent materials that yield a visual non-red color. These materials can be used to produce a solution ink that yields a detectable red fluorescent emission while having a different visual color.

What is claimed is:

1. A homogeneous solution ink comprising a toner having a red fluorescent dye and a non-red visual dye belonging to the spectral sensitizer class of dyes disposed within a resin and dissolved in a polar organic solvent to form a solution, said non-red visual dye having the characteristic of occasioning a wave length shift of the fluorescent emission of said red fluorescent dye and being selected from the group consisting of a polymethyne dye, an aryl carbonium dye and a Xanthene dye.

2. The solution of claim 1 including a surfactant.

3. The homogeneous solution ink of claim 1 wherein said solution comprises: 10 to 40% soluble resin having 1% to 10% red fluorescent dye and 0.05% to 0.5% non-red visual dye of the spectral sensitizer class of dyes, 60 to 80% polar organic solvent, and 20% to 45% surfactant.

4. A homogeneous ink that emits a first color in white light and second color when subjected to ultraviolet light comprising: a resin containing 1 to 10% of fluorescent dye and 0.05 to 0.5% of a visual dye belonging to the spectral sensitizer class of dyes, said non-red visual dye having the characteristic of occasioning a wave length shift of the fluorescent emission of said red fluorescent dye and being selected from the group consisting of a polymethyne dye, an aryl carbonium dye and a Xanthene dye.

* * * * *